United States Patent
Jin

[19]

[11] Patent Number: 5,960,210
[45] Date of Patent: Sep. 28, 1999

[54] NESTED-LOOP-SPECIALIZED CIRCUITRY FOR REPEATEDLY PERFORMED ARITHMETIC OPERATIONS IN DIGITAL SIGNAL PROCESSOR AND METHOD THEREOF

[75] Inventor: Seong-Ae Jin, Seoul, Rep. of Korea

[73] Assignee: LG Electronics, Inc., Seoul, Rep. of Korea

[21] Appl. No.: 08/927,583

[22] Filed: Sep. 11, 1997

[30] Foreign Application Priority Data

Sep. 11, 1996 [KR] Rep. of Korea ................. 96-39244

[51] Int. Cl.⁶ .................................................. G06F 9/30
[52] U.S. Cl. .............................. 395/800.01; 395/800.23; 395/800.24; 395/800.33; 395/800.36; 395/561; 395/562; 395/588
[58] Field of Search ...................... 395/800.01, 800.23, 395/800.24, 800.33, 800.36, 561, 562, 588

[56] References Cited

U.S. PATENT DOCUMENTS

| | | | |
|---|---|---|---|
| 4,158,227 | 6/1979 | Baxter et al. | 711/209 |
| 4,947,316 | 8/1990 | Fisk et al. | 395/285 |
| 5,438,670 | 8/1995 | Baror et al. | 711/3 |
| 5,710,902 | 1/1998 | Sheaffer et al. | 395/392 |
| 5,727,194 | 3/1998 | Shridhar et al. | 395/588 |

OTHER PUBLICATIONS

Texas Instruments "TMS320C2xx User's Guide", 1995, pp. 5–14.
Texas Instruments "TMS320C5x User's Guide", 1993, pp. 3–46 –3–50.

*Primary Examiner*—Meng-Ai T. An
*Assistant Examiner*—Dzung Nguyen

[57] ABSTRACT

An improved apparatus for processing a repeatedly performed arithmetic operation for a digital signal processor and a method thereof which are capable of pushing and popping values related to a repeat block to a register having a stack structure by providing a stack structure for processing a repeat block, this enabling a nested loop. The apparatus includes a register stack unit including a PASR register stack for pushing or popping a value to the PASR register, a PAER register stack for pushing or popping a value to the PAER register, and a BRCR register stack for pushing or popping a value to the BRCR register stack, a first comparison unit for judging whether a currently performed step is the end of the repeat block, and decreasing the value stored in the BRCR register by "1" when a desired condition is satisfied as a result of the judgement, otherwise, increasing the address value stored in the program counter by "1", and a second comparison unit for judging whether an externally inputted instruction corresponds to a state of the repeat block, outputting a control code based on the judged result to three stacks, respectively, and outputting the control code to the multiplexer in accordance with a control code from the first comparison unit, wherein said first comparison unit is enabled by receiving an externally inputted instruction through the second comparison unit.

12 Claims, 6 Drawing Sheets

FIG. 1
CONVENTIONAL ART

```
0   SPLK   #NUM1 BRCR
1   SPLK   END_BLOCK1 PAER
2   SPLK   STARTBLK PASR
3   STARTBLK
            •
            •
            •
10  SMMR BRCR TEMP1
11  SMMR PASR TEMP2
12  SMMR PAER TEMP3
            •
            •
            •
15  SPLK   #NUM2 BRCR
16  RPTB END_BLOCK2
            •
            •
            •
20  END_BLOCK2
21  LMMR BRCR TEMP1
22  LMMR PASR TEMP2
23  LMMR PAER TEMP3
            •
            •
            •
30  LAC BRCR
31  SUB 1
32  BC ANEQ STARTBLK
```

```
 0  SPLK   #NUM1  BRCR
 1  RPTB   END_BLOCK1
 2    •
      •
      •
 5  SPLK   #NUM2  BRCR
 6  RPTB   END_BLOCK2
      •
      •
      •
10  END_BLOCK2
      •
      •
      •
15  END_BLOCK1
```

FIG.4

|  | PASR | PAER | BRCR |
|---|---|---|---|
| 1th ADDRESS | 2 | 15 END_BLOCK1 | NUM1 |
| 6th ADDRESS | 7 | 10 END_BLOCK2 | NUM2 |
|  | 2 | 15 END_BLOCK1 | NUM1 |
| 10th ADDRESS | 7 | 10 END_BLOCK2 | NUM2-1 |
|  | 2 | 15 END_BLOCK1 | NUM |
| 11th ADDRESS | 2 | 15 END_BLOCK1 | NUM |
| 15th ADDRESS | 2 | 15 END_BLOCK2 | NUM-1 |

NESTED-LOOP-SPECIALIZED CIRCUITRY FOR REPEATEDLY PERFORMED ARITHMETIC OPERATIONS IN DIGITAL SIGNAL PROCESSOR AND METHOD THEREOF

BACKGROUND OF THE INVENTION

1. Field of the Invention

The present invention relates to an apparatus for processing a repeatedly performed arithmetic operation for digital signal processor (DSP) and a method thereof, and in particular to an improved apparatus for processing a repeatedly performed arithmetic operation for digital signal processor and a method thereof which are capable of significantly reducing a processing time of digital signal processor and effectively operating the digital signal processing by providing a plurality of registers each having a stack structure for storing values corresponding to a repeat block and pushing and popping the values stored in each register in order to process a repeat block which occurs during an arithmetic operation when repeatedly processing an arithmetic operation in the digital signal processor.

2. Description of the Conventional Art

Generally, the digital signal processor (DSP) is applicably used for a video, sound, speech signal processing apparatus for processing the signals in real time. In the digital signal processor (DSP), a processing speed thereof is considered as one of the most important factors in determining the performance of the DSP.

The programmer codes an algorithm used for an application with repect to a video, sound, speech, etc. into an assembly language which is provided by a corresponding DSP and an application is implemented by performing the coded language with respect to a corresponding DSP.

In the algorithm based on the assembly language, many arithmetic operations are repeatedly performed. Such repeatedly performed arithmetic operations are generally processed by one instruction.

There is one method which is recited herein as a conventional art which is disclosed in "a user's guide of TMX320C2x series and TMX320C5x series" published by TEXAS INSTRUMENT CO. According to the above-described article, the TEXAS INSTRUMENT CO. uses a TMX320C2x series and TMX320C5x series as a digital signal processor (DSP).

The block having a repeatedly performed arithmetic operation is called a repeat block. In the DSP of the TI Co., it is impossible to concurrently implement multiple repeat blocks. Therefore, if a programmer wishes to use multiple repeat blocks, the following technique is needed.

When there are provided a plurality of repeat blocks, in order to process an internal repeat block contained in an external repeat block, one instruction and three memory mapped registers should be used. A programmer loads the values which are inputted into and outputted from the registers to a predetermined load portion before the repeat block is performed. When the last instruction is performed, the programmer reads a corresponding value from the load portion and then corrects a corresponding register.

Here, a PASR register indicating a start address of a repeat block, a PAER register indicating an end address of a repeat block, and a BRCR register indicating the number of repeats are used. In addition, "RPTB" instruction is used as a block repeat instruction. The RPTB instruction is programmed such that a corresponding value is loaded to the PASR and PAER registers, and the BRCR register receives a corresponding value before the RPTB instruction is started.

FIG. 1 illustrates a program of a conventional method for processing an arithmetic operation which is repeatedly performed in the DSP. This method is used by TEXAS INSTRUMENT CO. There are provided two repeat blocks which are an internal repeat block and an external repeat block.

The SPLK, SMMR and LMMR are instructions for storing or loading a predetermined value, and RPTB is a block repeat instruction for repeatedly performing several instructions. LAC is an instruction for loading a corresponding value to an accumulator (not shown), SUB is an instruction for decreasing the value loaded into the accumulator by "1", and BC is a conditional branch.

In addition, BRCR, PASR and PAER are memory mapped registers. Among these registers, BRCR register stores the number of repeats therein, PASR register stores a start address of a block therein, and PAER register stores an end address of a block therein. TEMP1, TEMP2 and TEMP3 are temporary registers.

The operation of the conventional apparatus will now be explained with reference to FIGS. 1 and 2.

At the 0th address, NUM1 which is the number of repeats of an external repeat block is stored into the BRCR register. At the 1st address, an end address END_BLOCK1 of the external repeat block is stored into the PAER register. At the 2nd address, the start address STARTBLK of the external repeat block is stored into the PASR register.

At each of the 4th through 9th addresses, a predetermined instruction (not shown) is performed.

Next, at the 15th through 20th addresses, the internal repeat blocks are performed. Since the BRCR, PASR and PAER registers are continuously used in the internal repeat block, the values stored into the BRCR, PASR and PAER registers at the 10th through 12nd addresses are stored into the temporary registers TEMP1, TEMP2 and TEMP3, respectively.

Next, the arithmetic operation of the internal repeat block is performed.

At the 15th address, NUM2 is the number of repeats of the internal repeat block. Here, NUM2 is stored into the BRCR register. By the RPTB instruction which is performed at the 16th address, the start address of th internal repeat block is stored into the PASR register, and the end address END_BLOCK2 of the repeat block is stored into the PAER register.

At the 17th through 19th addresses, when the internal repeat block is performed once, NUM2 is reduced by "1", and the internal repeat block is repeatedly performed until NUM2 becomes 0(zero).

When NUM2 becomes 0 and then the arithmetic operation is finished in the internal repeat block, at the 21st and 23rd addresses, the values loaded in the temporary registers TEMP1, TEMP2 and TEMP3 are again stored into the registers BRCR, PASR, and PAER, respectively.

At the 24th through 29th addresses, a predetermined instruction is performed, and at the 30th address, the value stored into the BRCR register is loaded into the accumulator. At the 31st address, the value loaded into the accumulator is decreased by "1".

At the 32nd address, the value loaded into the accumulator is judged to be a non-equal zero. As a result of the judgement, if the condition is satisfied, the address is jumped to the address of STARTBLK. Otherwise, the external block, namely, the entire program is terminated.

FIG. 2 illustrates a DSP hardware apparatus which is implemented based on the program of FIG. 1. In the drawings, reference numeral 1 denotes a BRAF register which indicates a start of a repeat block, 2 denotes a PASR register which loads the start address of the repeat block, 3 denotes a PAER register which loads the end address of the repeat block, 4 denotes a BRCR register which loads the number of repeats of the repeat block, 5 denotes a program counter (PC), 6 denotes a comparison unit, and 7 denotes a multiplexer which determines the value of the program counter 5 and the next value of the program counter 5 based on the value loaded into the PASR register 2, respectively.

The operation of the internal repeat block of FIG. 1 will now be explained.

When a control code ss which indicates a start of the system is inputted from the BRAF register 1, an address corresponding to the instruction which is currently performed is inputted from the comparison unit 6 to the program counter 5, and the value END_BLOCK is inputted from the PAER register 3.

The comparison unit 6 reduces the value stored in the BRCR register 4 by 1. If the thusly reduced value is not "0", the values are compared whether the value inputted from the program counter 5 is identical with the value END_BLOCK1, and then the control code cs concerning thereto is outputted to the multiplexer 7. The multiplexer 7 receives the value of STARTBLK from the PASR register 2 and the output value from the program counter 5. The multiplexer 7 selects one value between two values and outputs to the program counter 5.

The above-described routine is repeatedly performed until the value stored in the BRCR register 4 becomes "0".

In the conventional method of processing an arithmetic operation which is repeatedly performed in the DSP, when the internal repeat blocks and the external repeat blocks are concurrently used, an additional process is needed for processing an arithmetic operation with respect to multiple repeat blocks.

In order to process an arithmetic operation with respect to the multiple repeat blocks, three temporary registers are additionally used. Therefore, the instructions SMMR and LMMR which are related to the temporary registers should be processed. In addition, the LAC, SUB and conditional branch which are instructions for repeatedly performing the external repeat block should be used.

In addition, since a nested loop is used in a computer program language such as C, Pascal, etc., an additional process for processing an arithmetic operation with respect to the multiple repeat blocks is not needed. However, in the above-described technique, since the nested loop can not be used, the time required to process the instructions related to the multiple repeat blocks is overloaded.

Furthermore, as the number of repeats of the repeat block is increased, the time overload is more increased. Therefore, the processing performance of the DSP is decreased.

SUMMARY OF THE INVENTION

Accordingly, it is an object of the present invention to provide an apparatus for processing a repeatedly performed arithmetic operation for a digital signal processor and a method thereof which overcome the aforementioned problem encountered in the conventional art.

It is another object of the present invention to provide an improved apparatus for processing a repeatedly performed arithmetic operation for a digital signal processor and a method thereof which are capable of pushing and popping values related to a repeat block to a register having a stack structure by providing a stack structure for processing a repeat block, this enabling a nested loop.

To achieve the above objects, there is provided an apparatus for processing a repeatedly performed arithmetic operation for a digital signal processor (DSP) which includes a register stack unit including a PASR register stack for pushing or popping a value to the PASR register, a PAER register stack for pushing or popping a value to the PAER register, and a BRCR register stack for pushing or popping a value to the BRCR register stack, a first comparison unit for judging whether a currently performed step is the end of the repeat block, and decreasing the value stored in the BRCR register by "1" when a desired condition is satisfied as a result of the judgement, otherwise, increasing the address value stored in the program counter by "1", and a second comparison unit for judging whether an externally inputted instruction corresponds to a state of the repeat block, outputting a control code based on the judged result to three stacks, respectively, and outputting the control code to the multiplexer in accordance with a control code from the first comparison unit, wherein said first comparison unit is enabled by receiving an externally inputted instruction through the second comparison unit.

To achieve the above objects, there is provided a method for performing a repeatedly performed arithmetic operation for a digital signal processor which includes the steps of a first step for pushing a start address value of the pre-set repeat block to a PASR register stack when an externally inputted instruction corresponds to a state of a predetermined repeat block, pushing an end address value of the repeat block to the PAER register, and pushing the number of repeats of the pre-set repeat block to the BRCR register stack, and a second step for popping values stored in the PASR register stack, the PAER register stack, and the BRCR register stack, respectively, when the currently performed repeat block is judged to performed the number of repeats stored in the BRCR register, otherwise, repeating the repeat block, wherein said first and second steps each include a substep for increasing an address by increasing a value of the program counter by "1".

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagram illustrating a program of a conventional method for processing an arithmetic operation which is repeatedly performed in a digital signal processor;

FIG. 4 is a diagram illustrating the structure of a stack of each register based on the program shown in FIG. 3 according to the present invention;

DETAILED DESCRIPTION OF THE INVENTION

Figures 2, 3:
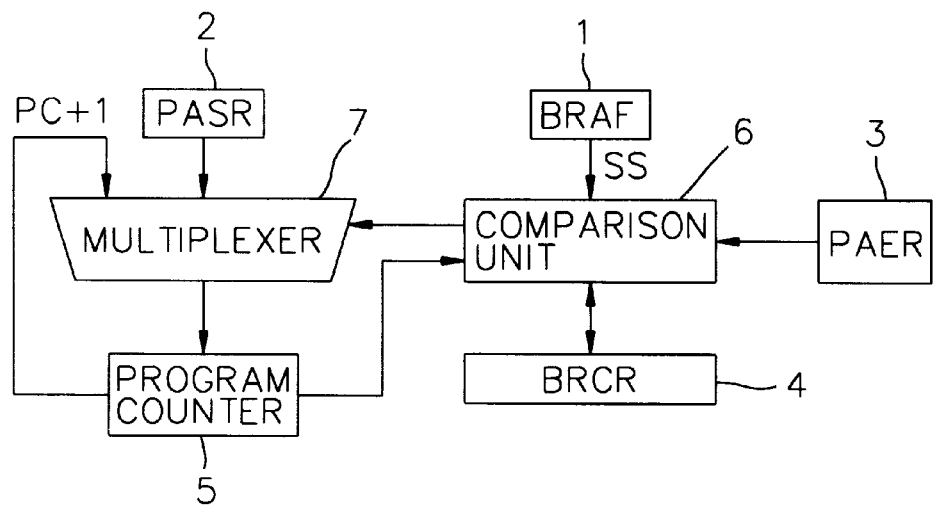
FIG. 2 is a block diagram illustrating a digital signal processor (DSP) hardware which is implemented by a program of FIG. 1.
FIG. 3 is a diagram illustrating a program of a method for processing an arithmetic operation which is repeatedly performed in a digital signal processor according to the present invention.

FIG. 3 illustrates a program of a method for processing an arithmetic operation which is repeatedly performed in a digital signal processor according to the present invention. As shown therein, an internal repeat block is defined from the 5th address to th 10th address, SPLK is an instruction for loading a predetermined value, RPTB is a block repeat instruction for repeatedly performing several instructions, NUM1 is the number of repeats of an external repeat block, NUM2 is the number of repeats of the internal repeat block, END_BLOCK1 is an end address of the external repeat block, and END_BLOCK2 is an end address of the internal repeat block.

The operation of the program will now be explained with reference to FIG. 4 which illustrates the structure of a stack of each register.

At the 0th address, NUM1 is pushed to the BRCR register stack. At the 1st address, the RPTB instruction is performed. Therefore, the start address of the external repeat block is pushed to the PASR register stack, and the end address END_BLOCK1 of the external repeat block is pushed to the PASR register stack. At this time, as shown in FIG. 4, "2" is pushed to the PASR register stack, and "15" is pushed to the PAER register stack, and NUM1 is pushed to the top of the BRCR register stack.

At each of the 2nd through 4th addresses, a predetermined instruction (not shown) is performed.

At the 5th address, NUM2 is pushed to the BRCR register stack, and at the 6th address, the start address of the internal repeat block is pushed to the PASR register stack, and the end address END_BLOCK2 of the internal repeat block is pushed to the PAER register. At this time, "7" is pushed to the PASR register stack, "10" is pushed to the top of the PAER register stack, and NUM2 is pushed to the top of the BRCR register stack.

At each of the 7th through 9th address, a predetermined instruction (not shown) is performed. When the internal repeat block is performed once, NUM2 is reduced by "1", and the internal repeat block is repeatedly performed until NUM2 becomes "0".

When NUM2 becomes "0" and the arithmetic operation is finished in the internal repeat block, the values of the top stored in each register stack are popped, and at the 11st address, the values stored in each register are shown in FIG. 4.

At the 11st through 14th addresses, a predetermined instruction (not shown) is performed. Thereafter, the external repeat block is performed. When the external repeat block is performed once, the value of NUM2 stored in the BRCR register is reduced by "1", and at the 15th address, the value is jumped to the address of END_BLOCK1.

The above-described arithmetic operation is repeatedly performed until the value of NUM1 stored in the BRCR register becomes "0". When the value of NUM1 becomes "0", the external repeat block, namely, the entire program is finished.

Figure 5:
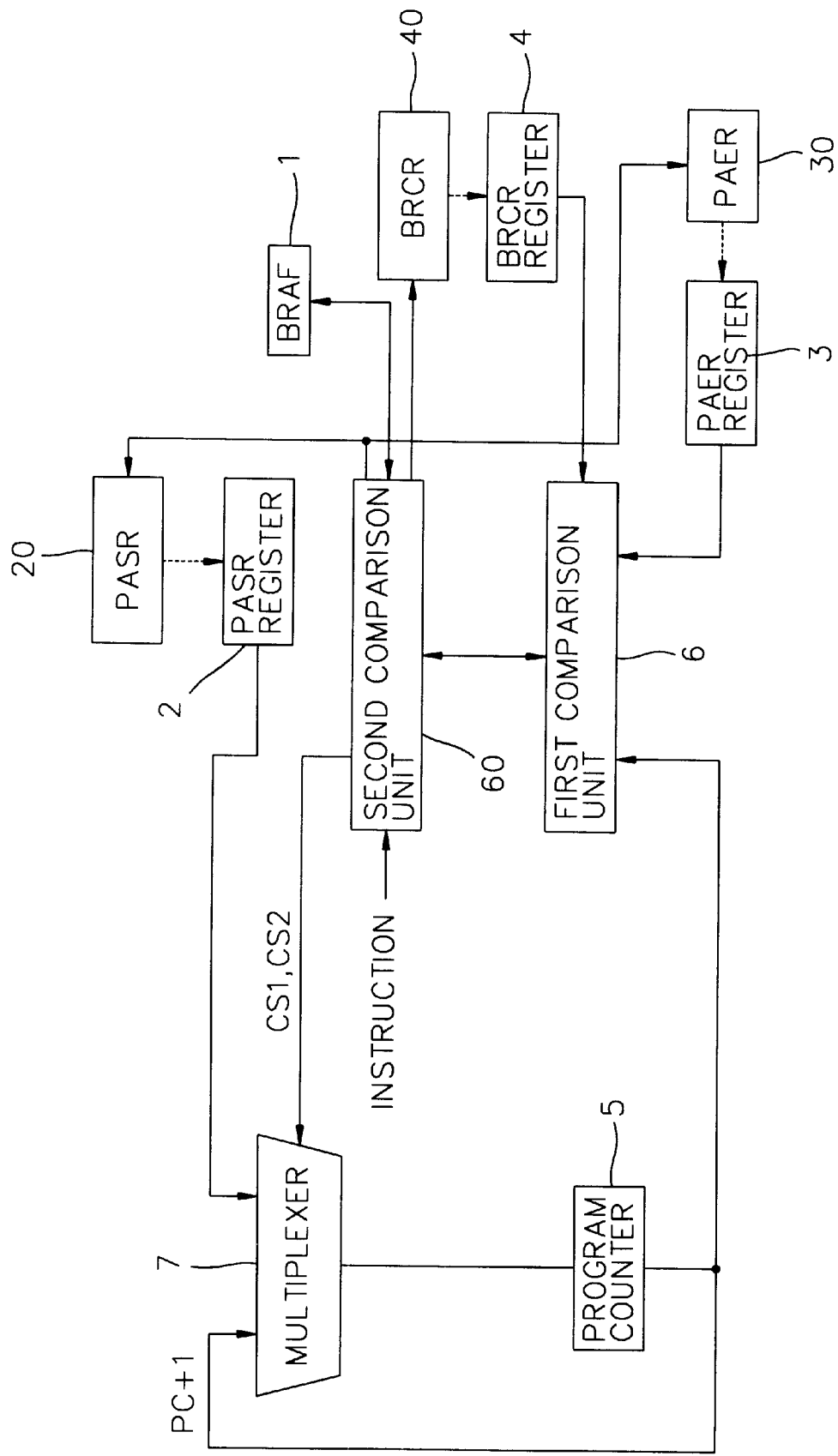
FIG. 5 is a block diagram illustrating an apparatus for processing an arithmetic operation which is repeatedly performed in a digital signal processor (DSP) according to the present invention.

FIG. 5 illustrates an apparatus for processing an arithmetic operation which is repeatedly performed in a digital signal processor (DSP) according to the present invention. As shown therein, identically to FIG. 2, reference numeral 1 denotes a BRAF register, 2 denotes a PASR register, 3 denotes a PAER register, 4 denotes a BRCR register, 5 denotes a program counter 5, and 7 denotes a multiplexer.

In addition, reference numeral 20 denotes a PASR stack for pushing or popping a predetermined value to the PASR register 2, 30 denotes a PAER stack for pushing or popping a predetermined value to the PAER register 3, and 40 denotes a BRCR stack for pushing or popping a predetermined value to the BRCR register 4.

The first comparison unit 6 compares the address value stored in the program counter 5 with the address value stored in the PAER register 3, and outputs a control code so that in accordance with the resultant value of the comparison, the value stored in the BRCR register 4 is reduced by "1", and the value stored in the program counter 5 is increased by "1".

The second comparison unit 60 receives an instruction and outputs a control code for determining a pushing and popping operation of the stacks and outputs two control codes cs1 and cs2 to the multiplexer 7 in accordance with the control code from the first comparison unit 6. Here, the control code cs1 is a control code which passes through the value stored in the PASR register 2, and the control code cs2 is a control code which passes through the value of the program counter 5 which value is increased by "1".

Figure 6:
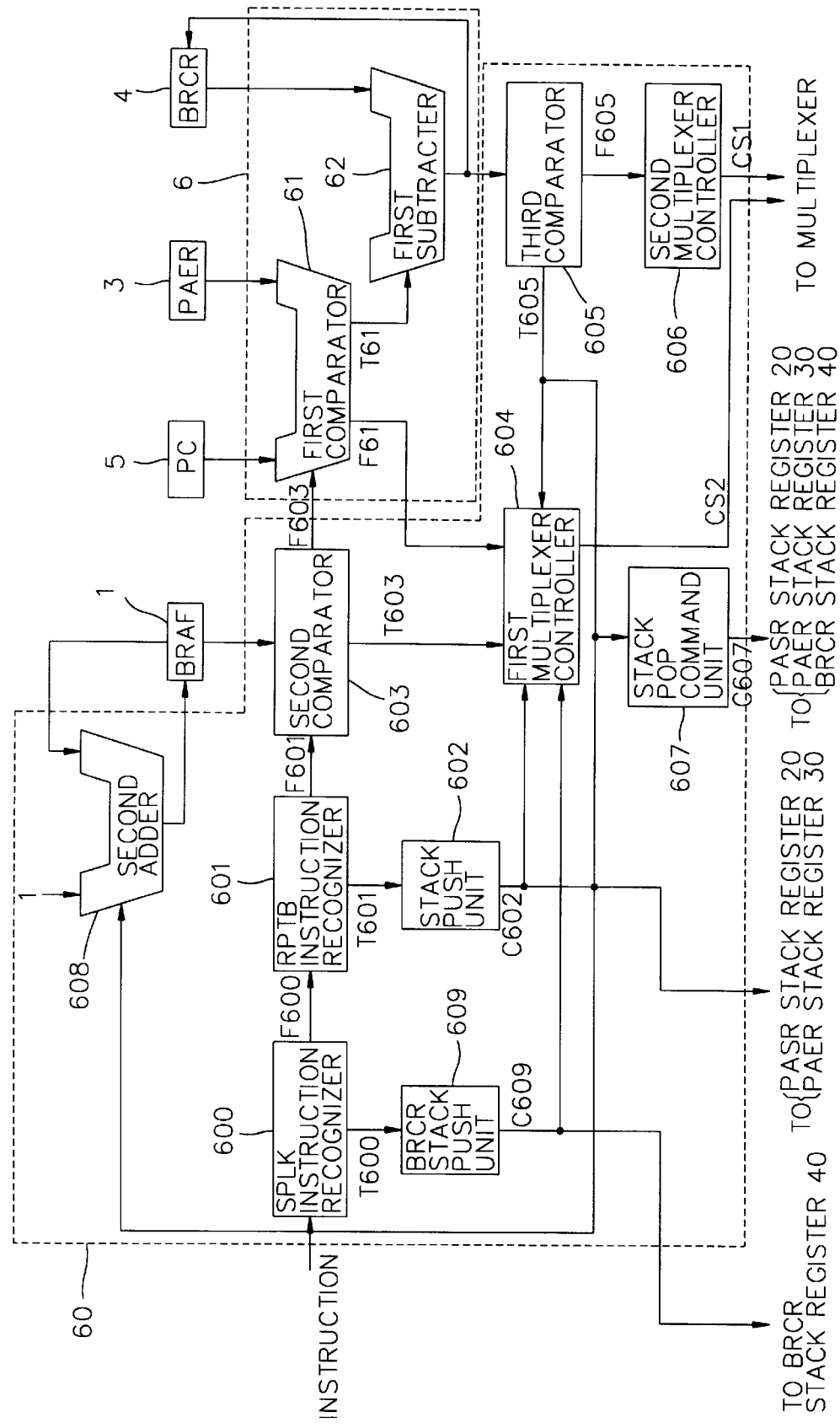
FIG. 6 is a detailed diagram illustrating the apparatus of FIG. 4 according to the present invention.

FIG. 6 illustrates the apparatus of FIG. 4 according to the present invention. As shown therein, the first comparison unit 6 includes a first comparator 61 for comparing an address value stored in the program counter 5 with an address value stored in the PAER register 3, outputting a code T61 when two address values are identical as a result of the comparison, and outputting a code F61 when the same are not identical, and a first subtracter 62 for reducing the address value stored in the BRCR register 4 by "1" in accordance with the code T61 and outputting the reduced value to the second comparison unit 60.

The second comparison unit 60 includes a SPLK instruction recognizer 600 for outputting a code T600 when the instruction inputted is a SPLK instruction for loading the number of repeats of the repeat block, otherwise, outputting a code F600, a BRCR stack PUSH instruction unit 609 for receiving the code T600 and generating a control code c609 by which the BRCR stack 40 performs a pushing operation, an RPTB instruction recognizer 601 for receiving the code F600, and outputting a code T601 when the instruction inputted is a RPTB instruction which indicates the repeat block, otherwise, outputting a code F601, a stack push unit 602 for receiving the code T601 and generating a control code C602 by which the PAER stack 30 performs a pushing operation and the value of the BRAF register is increased by "1", a second comparator 603 for receiving the code F601 judged whether the value loaded in the BRAF register 1 is "0", outputting a code F603 to the first comparator 61 of the first comparison unit 6 when the value is not "0", and outputting a code T603 when the value is "0", a third comparator 605 for judging whether the output value from the first subtracter 62 of the first comparison unit 6 is "0", outputting a code T605 when the output value is "0" as a result of the judgement, and outputting a code F605 when the output value is not "0" as a result of the judgement, a controller 606 for receiving the code F605 and outputting the control code cs1 to the multiplexer 7 so that the value from the program counter 5 is substituted with the value stored in the PASR register 2, a stack pop instruction unit 607 for receiving the code T605 and generating a control code by which the PASR stack 20, the PAER stack 30, the BRCR stack 40 perform the popping operation, a second adder 608 for receiving the code c602, increasing the value stored in the BRAF register 1 by "1", receiving the code T605, and decreasing the value stored in the BRAF register 1 by "1", and a first multiplexer controller 604 for receiving the codes c609, c602, T603, F61 and T605 and outputting the control code to the multiplexer 7 in order to increase the value of the program counter by "1".

Figure 7:
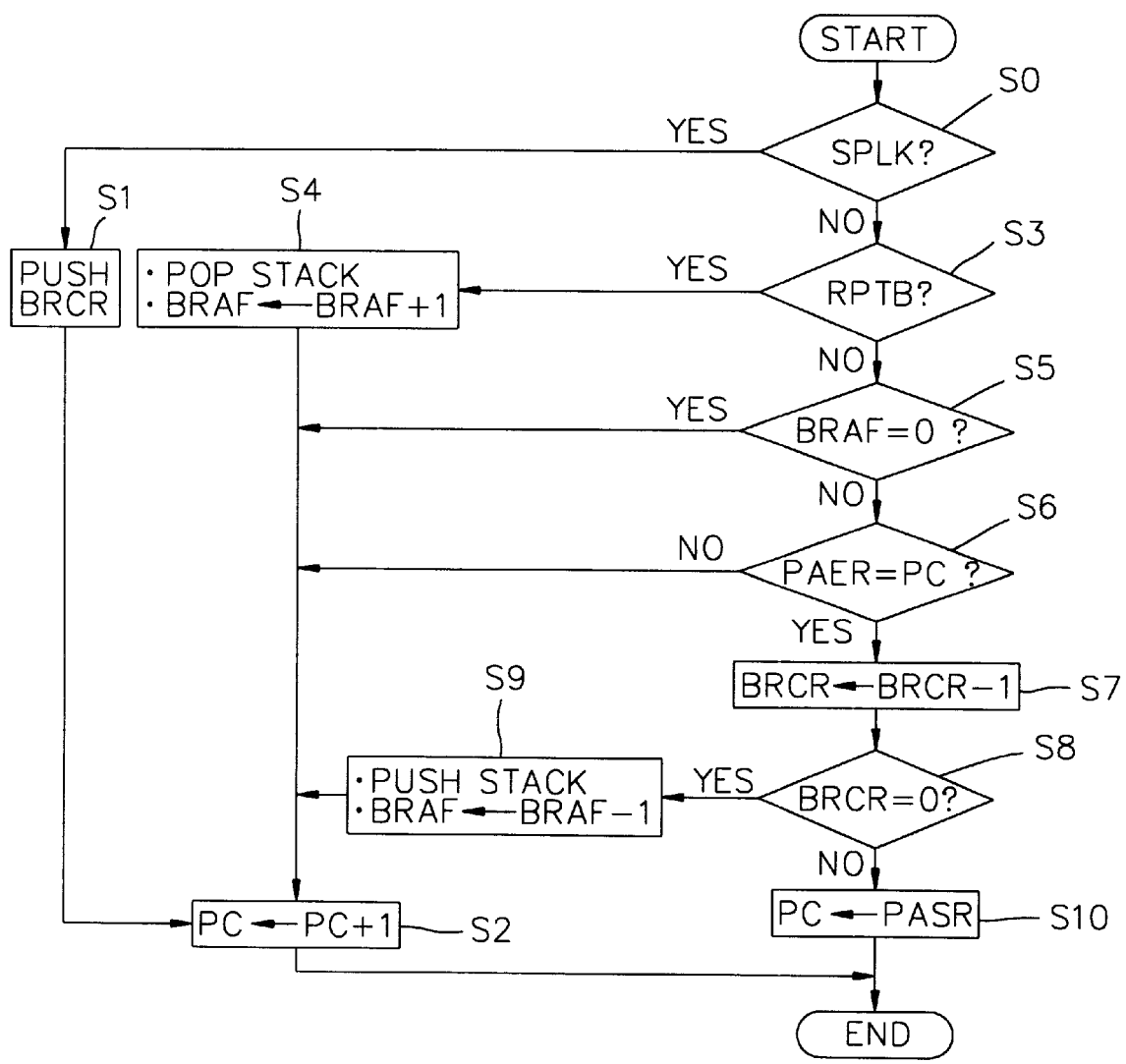
FIG. 7 is a flow chart of an operation of FIG. 3 according to the present invention.

FIG. 7 is a flow chart of an operation of FIG. 3 according to the present invention.

The operation of the apparatus for processing an arithmetic operation which is repeatedly performed in the DSP according to the present invention with reference to the accompanying drawings.

When the program is activated, the BRAF register 1 and the program counter 5 are set to "0".

At the 0th address, an SPLK instruction is inputted into the SPLK instruction recognizer of the second comparison unit 60. The SPLK instruction recognizer 600 outputs the code T602, and the BRCR stack PUSH unit 609 outputs a control code c609 to the BRCR stack 40 in accordance with the control code T602. The BRCR stack 40 pushes "NUM1" which indicates the number of repeats of the external repeat block to the BRCR register 4. On addition, the first multiplexer controller 604 outputs a control code CS2 in accordance with the control code c609, and the multiplexer 7 inputs the value which is increased by the program counter by "1" to the program counter 5. Therefore, "1" is currently stored in the program counter 5 in Steps S0, S1 and S2 shown in FIG. 7.

Whenever the instructions are performed one by one, the values stored in the program counter 5 is increased by "1". In Step S2, the address is increased by "1". When the external or internal repeat block is repeated, the second multiplexer controller 606 outputs a control code CS1. This operation will be described later when describing the 10th and 15th addresses.

At the 1st address, when the RPTB instruction is inputted, the SPLK instruction recognizer 600 outputs a control code F600, and the RPTB instruction recognizer 601 outputs a control code T601. The stack push unit 602 outputs a control code C602 in accordance with the control code T601, and the PASR stack 20 pushes "2" which is a start address of the external repeat block to the PASR register 2, and the PAER stack 30 pushes the END_BLOCK1 "15" which is an end address of the external repeat block to the PAER register 3. In addition, the second adder 608 is driven in accordance with the control code C602, and the value stored in the BRAF register 1 is increased by "1" in Steps S0, s3, S4 and S2.

As shown in FIG. 4, "2" is pushed into the PASR register, "15" is pushed into the PAER register, and "NUM1" is pushed into the BRCR register.

When a predetermined instruction is inputted from the 2nd address, since the instruction is not RPTB, the RPTB instruction recognizer 601 outputs a control code F601, and the second comparator 603 is enabled by the control code F601, and checks whether the value loaded into the BRAF register 1 is "0". At this time, since "1" is loaded into the BRAF register 1, the second comparator 603 outputs a code F603. The first comparator 61 of the first comparison unit 6 receives the code F603 and compares the thusly received code with the values stored in the program counter 5 and the PAER register 3. As a result of the comparison, when the two values are not identical, the first comparator 61 outputs a code F61. The value of the program counter 5 is increased by the first multiplexer 604 by "1" in Steps S0, S3, S5, S6 and S2.

At the 3rd and 4th addresses, the routine performed at the 2nd address is performed in steps S0, S3, S5, S6 and S2.

When an SPLK instruction is inputted from the 5th address, the arithmetic operation is performed identically at the time when the SPLK instruction is inputted from the 0th address. The BRCR stack 40 pushes "NUM2", which indicates the number of repeats of the internal repeat block, to the BRCR register 4 in accordance with the control code c609 from the BRCR register stack 40 in Steps S0, S1, and S2 shown in FIG. 7.

At the 6th address, when an RPTB instruction is inputted, the arithmetic operation is performed identically at the time when the RPTB instruction is inputted from the 1st address. The value "7" is a start address of the internal repeat block that is pushed into the PASR register 2, and END_BLOCK2 "10" which is an end address of the internal repeat block is pushed into the PAER register 3. In addition, the second adder 608 is activated in accordance with the control code C602, and the value of "1" stored in the BRAF register 1 is increased by "1" in Steps S0, S3, S4 and S2.

As shown in FIG. 4, "7" is pushed into the PASR register, "10" is pushed into the PAER register, and "NUM2" is pushed into the BRCR register.

At the 7th address, when a predetermined instruction is inputted, the arithmetic operation is performed identically at the time when a predetermined instruction is inputted from the 2nd address. At this time, since "2" is loaded into the BRAF register 1, the second comparator 603 outputs a code F603, and the first comparator 61 compares the values compared in the program counter 5 and the PAER register 3. As a result of the comparison, if two values are not identical, the second comparator 603 outputs a code F61 in Steps S0, S3, S5, S6 and S2.

At the 8th and 9th addresses, the arithmetic operation is performed identically to the 7th address.

At the 10th address, since the value stored in the PAER register 3 and the value counted by the program counter 5 are identically "10", the first comparator 61 outputs a code T61, and the first subtracter 62 subtracts "1" from the value of "NUM2" stored in the BRCR register 4. The third comparator 605 checks whether the value of "NUM2-1" is "0" as a result of the subtraction. If the value is not "0", the third comparator 605 outputs the code F605 to the second multiplexer controller 606. The second multiplexer controller 606 outputs a control code CS1 such that the multiplexer 7 outputs the value of "7" stored in the PASR register 2 to the program counter 5. The above-described operation denotes that the internal repeat block is repeated again in Steps S0, S3, S5, S6, S7, S8 and S10.

When the internal repeat block is repeatedly performed as many as the number of "NUM2" stored in the BRCR register, at the 10th address, since the value of "NUM2-1" inputted into the third comparator 605 becomes "0", the third comparator 605 outputs a code T605, and the stack POP instruction unit 607 outputs a control code C607. The BRCR stack 40 pops the value of "NUM2" stored in the BRCR register 4 in accordance with the control code C607, and the PASR stack 20 pops "7" stored in the PASR register 2, and the PAER stack 30 pops "10" stored in the PAER register 3 in Steps S0, S3, S5, S6, S7, S8, S9 and S2.

As shown in FIG. 4, at this time, "2" is stored in the PASR register, "15" is stored in the PAER register, and "NUM1" is stored in the BRCR register.

At the 11st address, the arithmetic operation is performed identically to the second address.

At the 15th address, since the value of "END_BLOCK1" stored in the PAER register 3 and the value counted by the program counter 5 are "15", the first comparator 61 outputs a code T61, and the first subtracter 62 subtracts "1" from the value of "NUM1" stored in the BRCR register 4. The third comparator 605 checks whether the value of "NUM1-1" is "0". As a result of the subtraction, if the value is not "0", the third comparator 605 outputs the code F605 to the second multiplexer controller 606. Therefore, the value of "2" stored in the PASR register 2 is stored into the program counter 5.

When the external repeat block including the internal repeat block is performed as many as the number of "NUM1", at the 15th address, since the value of "NUM1-1" inputted into the third comparator 605 is "0", the third comparator 605 outputs a code T605, and the stack POP instruction unit 607 outputs a control code C607. Therefore, the BRCR stack 40 pops the value of "NUM1" stored in the BRCR register 4 in accordance with the control code C607, and the PASR stack 20 pops "2" stored in the PASR register 2, and the PAER stack 30 pops "15" stored in the PAER register 3.

Therefore, the operation with respect to the entire repeat block is finished.

As described above, in the present invention, since the stack structure is used, the number of repeat blocks is determined based on the size of the stack. Therefore, it is possible to add a predetermined number of repeat blocks by simply changing the size of the stack without using an instruction for processing an arithmetic operation with respect to the multiple repeat blocks.

In addition, compared to the conventional apparatus in which the SMMR and LMMR instructions related with the temporary register must be processed, and the LAC and SUB and conditional branch which is an instruction for repeatedly performing the external block must be used, in the present invention, since such instruction is not used, the time required for performing such instructions is decreased.

Therefore, it is possible to more easily program. In addition, since the instruction is not performed, the program execution time is decreased, and the processing speed of the DSP is enhanced.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. In a digital signal processor (DSP), which which has a BRAF register for storing a value indicating a start of a repeat block therein, a PASR register for storing a start address of the repeat block therein, a PAER register for storing an end address of the repeat block therein, a BRCR register for storing the number of repeats of the repeat block therein, a program counter for increasing an inputted address value by "1", and a multiplexer for selecting one of an address value from the program counter and an address value from the PASR register and for outputting the selected value to the program counter, an apparatus for performing a repeatedly performed arithmetic operation for said digital signal processor, comprising:

a PASR stack for pushing or popping a value to the PASR register;

a PAER stack for pushing or popping a value to the PAER register; and a BRCR stack for pushing or popping a value to the BRCR register stack;

a first comparison unit for judging whether a currently performed step is the end of a current repeat block, and if so then decrementing the value stored in the BRCR register, and if not then incrementing the address value stored in the program counter; and a second comparison unit, responsive to said first comparison unit, for judging whether a current repeat block is the last of a plurality of nested repeat blocks, and, according to the judgement, for outputting at least one control code to at least one of said three stacks and to the multiplexer in accordance with the control code from the first comparison unit, wherein said first comparison unit is responsive to the second comparison unit.

2. The apparatus of claim 1, wherein said first comparison unit compares an address value stored in the program counter with an address value stored in the PAER register for judging whether the currently performed step is an end of the repeat block.

3. The apparatus of claim 1, wherein said first comparison unit includes:

a first comparator for comparing an address value stored in the program counter with an address value stored in the PAER register; and a first subtracter for decrementing the address value stored in the BRCR register when two values are identical as a result of the comparison by the first comparator and outputting the decreased value to the second comparison unit.

4. The apparatus of claim 3, wherein said second comparison unit includes:

a SPLK instruction recognizer for outputting a code (T600) when an instruction inputted is an SPLK instruction for loading the number of repeats of the repeat block, otherwise, outputting a code (F600);

a BRCR stack PUSH instruction unit for receiving the code (T600) and outputting the control code (c609) which is used such that the BRCR register stack performs a pushing operation, to the BRCR stack;

a RPTB instruction recognizer for receiving the code (F600), outputting a code (T601) when the instruction received corresponds to the RPTB instruction indicating the repeat block, otherwise, outputting the code (F601);

a stack push unit for receiving the code (T601) and generating a control code (C602) by which the PASR register stack and the PAER register stack perform a pushing operation and increases the value of the BRAF register by "1";

a second comparator for receiving the code (F601), judging whether the value loaded into the BRAF register is "0", outputting a code (F603) to the first comparator of the first comparison unit when the value is not "0", and outputting a code (T603) when the value is "0";

a third comparator for judging whether an output value from the first subtracter of the first comparison unit is "0", outputting a code (T605) when the output value is "0", and outputting a code (F605) when the output value is not "0";

a second multiplexer controller for receiving the code (F605) and outputting a control code (cs2) to the multiplexer so that the value from the program counter is substituted with a value stored in the PASR register;

a stack pop instruction unit for receiving the code (T605) and generating a control code so that the PASR register stack, the PAER register stack and the BRCR register stack perform a popping operation, respectively;

a second adder for receiving the code (c602) or the code (T605), correspondingly increasing a value stored in the BRAF register by "1" or decreasing a value stored in the BRAF register by "1", respectively; and a first multiplexer controller for receiving the codes (c609, c602, T603, F61 and T605) and outputting a control code (cs2) to the multiplexer for increasing the value from the program counter by "1".

5. The apparatus of claim 3, wherein said second comparison unit includes:

a load recognition unit to recognize an instruction to load a repetition number;

a first push unit, responsive to the load recognition unit, to push said repetition number onto said BRCR stack;

a repeat recognition unit to recognize a to-be-repeated instruction;

a second push unit, responsive to said repeat recognition unit, to push values onto said PASR stack and said PAER stack and to increase a value in a repeat-block-tally register;

a second comparator to compare said value in said repeat-block-tally register against a first reference value;

a third comparator to compare said decreased value from said subtracter against a second reference value;

a second multiplexer controller, responsive to said third comparator, to cause said multiplexer to select a value stored in said PASR register;

a pop unit, responsive to said third comparator, to pop values off said PASR stack and said PAER stack;

a second adder, responsive to said second push unit and said third comparator, to increase or decrease said value in said repeat-block-tally register, respectively; and a first multiplexer controller, responsive to said second push unit, said first comparator, said second comparator and said third comparator, to cause said multiplexer to increment a value stored in said program counter.

6. In a digital signal processor (DSP) having a PASR register for storing a start address of the repeat block, a PAER register for storing an end address of the repeat block, a BRCR register for storing a number of repeats of the repeat block therein, and a program counter (PC) for incrementing an inputted address value, a method for processing a repeatedly performed arithmetic operation for said DSP, said method comprising:

a first step of pushing a start address value of the pre-set repeat block to a PASR stack, pushing an end address value of the repeat block to a PAER stack, and pushing the number of repeats of the pre-set repeat block to a BRCR stack; and a second step of popping values stored in the PASR stack, the PAER stack, and the BRCR stack, respectively, when the currently performed repeat block is judged to have been performed the number of repeats stored in the BRCR register, otherwise, repeating the repeat block, wherein said first and second steps each include a sub-step for increasing an address by incrementing a value of the program counter.

7. The method of claim 6, wherein said second step includes:

a first sub-step of decrementing a value stored in the BRCR register when a current address value is identical with the end address value of a corresponding repeat block; and a second sub-step of popping values stored at the tops of the PASR stack, the PAER stack, and the BRCR stack, respectively, when a value stored in the BRCR register becomes "0".

8. The method of claim 7, wherein, in said first sub-step, it is judged that whether an address value stored in the PAER register is identical to the value stored in the program counter.

9. In a digital signal processor (DSP) having block-executing circuitry to execute a block of at least one arithmetic operation that is to be repeatedly performed, an apparatus for managing execution of at least two of said nested blocks, said apparatus comprising:

a plurality of parameter registers to store parameters of a current block being executed currently by said block-executing circuitry;

a plurality of parameter stacks for said parameters of at least one less-inwardly nested block;

nest management circuitry to recognize a more-inwardly nested block within said current block, to push parameters of said current block from said plurality of parameter registers onto said plurality of parameter stacks as less-inwardly-nested-block parameters, and to store parameters of said more-inwardly nested block into said plurality parameter registers as current-block parameters;

said nest management circuitry being operative, upon completion of said current block by said block-executing circuitry, to pop said less-inwardly-nested-block parameters off said plurality of parameter stacks and into said plurality of parameter registers as current-block parameters.

10. The apparatus of claim 9, wherein said plurality of parameter registers includes:

a start register to store a starting address of said current block;

an end register to store an end address of said current block; and a loop register to store a repetition number corresponding to how many times that said at least one arithmetic operation of said current block is to be repeated.

11. The apparatus of claim 9, wherein said plurality of parameter stacks includes:

a start address stack for a starting address of said at least one less-inwardly stacked block;

an end address stack for an ending address of said at least one less-inwardly stacked block; and a loop stack for a repetition number of said at least one less-inwardly nested block.

12. The apparatus of claim 9, wherein said plurality of stacks are configured to accommodate parameters of at least two less-inwardly nested blocks.

* * * * *